United States Patent
Izumino et al.

(10) Patent No.: US 7,708,644 B2
(45) Date of Patent: May 4, 2010

(54) TRIPOD CONSTANT VELOCITY UNIVERSAL JOINT

(75) Inventors: Junichi Izumino, Iwata (JP); Minoru Ishijima, Iwata (JP)

(73) Assignee: NTN Corporation, Osaka-fu (JP)

( * ) Notice: Subject to any disclaimer, the term of this patent is extended or adjusted under 35 U.S.C. 154(b) by 618 days.

(21) Appl. No.: 11/370,838

(22) Filed: Mar. 9, 2006

(65) Prior Publication Data

US 2006/0217205 A1 Sep. 28, 2006

(30) Foreign Application Priority Data

Mar. 24, 2005 (JP) ............................. 2005-086518

(51) Int. Cl.
F16D 3/26 (2006.01)
(52) U.S. Cl. ....................................... 464/111; 464/905
(58) Field of Classification Search ................. 464/111, 464/120, 123, 124, 905
See application file for complete search history.

(56) References Cited

U.S. PATENT DOCUMENTS

| 5,256,107 | A | 10/1993 | Matsumoto et al. | |
|---|---|---|---|---|
| 0,041,621 | A1 | 11/2001 | Sugiyama et al. | |
| 6,454,655 | B1 | 9/2002 | Kudo et al. | |
| 6,475,092 | B1 | 11/2002 | Kura et al. | |
| 6,478,682 | B1 * | 11/2002 | Kura et al. | 464/111 |
| 6,752,721 | B2 * | 6/2004 | Kawakatsu et al. | 464/111 |
| 6,764,406 | B2 * | 7/2004 | Mizukoshi et al. | 464/111 |
| 2002/0032063 | A1 | 3/2002 | Watanabe et al. | |
| 2002/0128077 | A1 | 9/2002 | Kawakatsu et al. | |
| 2002/0183121 | A1 | 12/2002 | Kura et al. | |
| 2004/0157667 | A1 * | 8/2004 | Ishijima et al. | 464/111 |
| 2004/0157677 | A1 | 8/2004 | Roach et al. | |

FOREIGN PATENT DOCUMENTS

| EP | 1 225 359 | 7/2002 |
|---|---|---|
| EP | 1 253 337 | 10/2002 |
| EP | 1 413 787 | 4/2004 |
| GB | 2 226 102 | 6/1990 |
| GB | 2226102 A * | 6/1990 |
| JP | 10-96430 | 4/1998 |
| JP | 2000-320563 | 11/2000 |
| JP | 2001-99180 | 4/2001 |
| JP | 2001-317560 | 11/2001 |
| JP | 2001-330049 | 11/2001 |
| JP | 2004-218686 | 8/2004 |
| JP | 2004-257418 | 9/2004 |

* cited by examiner

*Primary Examiner*—Greg Binda
*Assistant Examiner*—Clifford J Louden
(74) *Attorney, Agent, or Firm*—Wenderoth, Lind & Ponack, L.L.P.

(57) ABSTRACT

A tripod constant velocity universal joint includes among others an inner joint member having a boss 22 and journals 24 radially protruding from the boss, a radius of curvature $R_1$ as viewed in a cross section of a journal bottom part 23 connecting the boss 22 to the journal 24 and as measured at opposing locations in a circumferential direction of the joint is larger than a radius of curvature $R_2$ of the journal bottom part as viewed in its cross section and as measured at opposing locations in an axial direction of the joint and $R_1$ gradually decreases down to $R_2$.

8 Claims, 5 Drawing Sheets

TRIPOD CONSTANT VELOCITY UNIVERSAL JOINT

BACKGROUND OF THE INVENTION

1. Field of the Invention

The present invention relates to a tripod constant velocity universal joint for use in a drivetrain of an automobile, for example, for transmission of torque with constant angular velocity between two rotary axes at any angle and allowing axial displacement.

2. Description of the Background Art

Generally, a tripod constant velocity universal joint comprises an outer joint member adapted to be connected to a first rotary shaft for transmission of torque and having three, circumferentially equispaced, axially extending track grooves formed in an inner circumference thereof, an inner joint member having a boss adapted to be connected to a second rotary shaft for transmission of torque and three circumferentially equispaced journals radially protruding from the boss, and rollers interposed between the outer joint member and the inner joint member to transmit torque.

In the tripod constant velocity universal joint, there is a high possibility that a journal bottom part is a weakest part of the inner joint member in strength. Japanese unexamined patent publication 2004-257418 discloses a tripod constant velocity universal joint of so-called double roller type in which an outer roller rolls in parallel to a track groove to realize reduction in weight and size while maintaining the strength of the inner joint member.

The tripod constant velocity universal joint described in Japanese unexamined patent publication 2004-257418 is characterized in that the journal bottom part of the inner joint member is of a non-circular cross section with a diameter measured circumferentially of the joint being larger than a diameter measured axially of the joint. Thus, reduction in size, weight and costs of the joint can be realized while maintaining the strength of the journal bottom part as a possible weakest part of a trunnion in strength.

SUMMARY OF THE INVENTION

In the tripod constant velocity universal joint of double roller type, when limit design is intended for reduction in size and weight, the non-circular cross section of the journal bottom part is insufficient to maintain the strength of the journal bottom part and a radius of curvature of the journal bottom part needs to be increased. However, in the case where the radius of curvature of the journal bottom part is constant throughout the circumference of the journal, an increase in the radius of curvature causes the roller to come close to the journal bottom part faster as the joint takes operating angle as viewed in the cross section including the joint axis and the journal axis and thus a maximum operating angle of the joint needs to be sacrificed. This can be prevented by reducing the diameter of the journal bottom part measured axially of the joint in the cross section. Nevertheless, the cross-sectional area of the journal bottom part becomes smaller, resulting in a decrease in strength.

An object of the present invention is to solve the above-mentioned problem and to provide a tripod constant velocity universal joint which can realize reductions in size, weight and costs without sacrificing a maximum operating angle of the joint while maintaining the strength of the journal bottom part as a weakest part of the inner joint member in strength.

A tripod constant velocity universal joint of the present invention comprises an outer joint member having three, circumferentially equispaced, axially extending track grooves formed in an inner circumference thereof, the outer joint member being connected to a first rotary shaft for transmission of torque, an inner joint member having a boss connected to a second rotary shaft for transmission of torque and three circumferentially equispaced journals each radially protruding from the boss, and a roller cassette interposed between the outer joint member and the inner joint member for transmission of torque, wherein a radius of curvature ($R_1$) of a journal bottom part connecting the boss to the journal as viewed in a plane perpendicular to an axis of the joint is larger than a radius of curvature ($R_2$) of the journal bottom part as viewed in a plane including the axis of the joint and an axis of the journal and the radius of curvature gradually decreases from $R_1$ down to $R_2$.

In the tripod constant velocity universal joint in which the roller cassette rolls in parallel to the track groove and can swing and rotate with respect to the journal of the inner joint member, by making the radius of curvature $R_1$ larger than the radius of curvature $R_2$, and continually decreasing the radius of curvature from $R_1$ to $R_2$, it is possible to provide the tripod constant velocity universal joint which can realize reductions in size, weight and costs without sacrificing a maximum operating angle of the joint while maintaining the strength of the journal bottom part as a weakest part of the inner joint member in strength.

According to the present invention, reductions in size, weight and costs of the joint can be realized without sacrificing a maximum operating angle of the joint while maintaining the strength of the journal bottom part as a weakest part of the inner joint member in strength.

These and other objects and features of the invention will become more apparent from the following description when read in conjunction with the accompanying drawings.

DETAILED DESCRIPTION OF THE INVENTION

Figure 2:
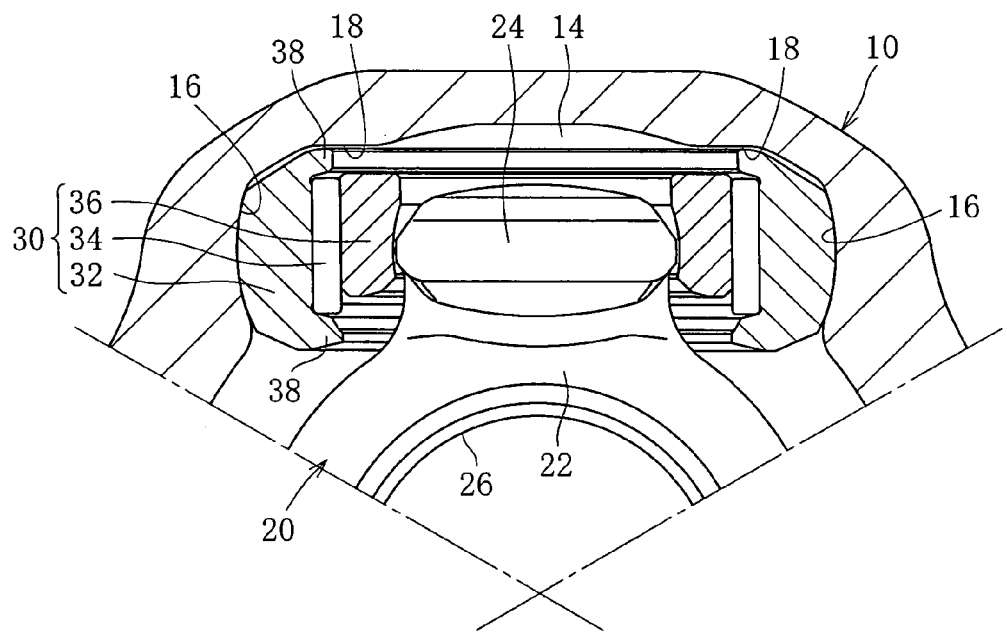
FIG. 2 is a cross-sectional view in part of the tripod constant velocity universal joint.
Figure 3:
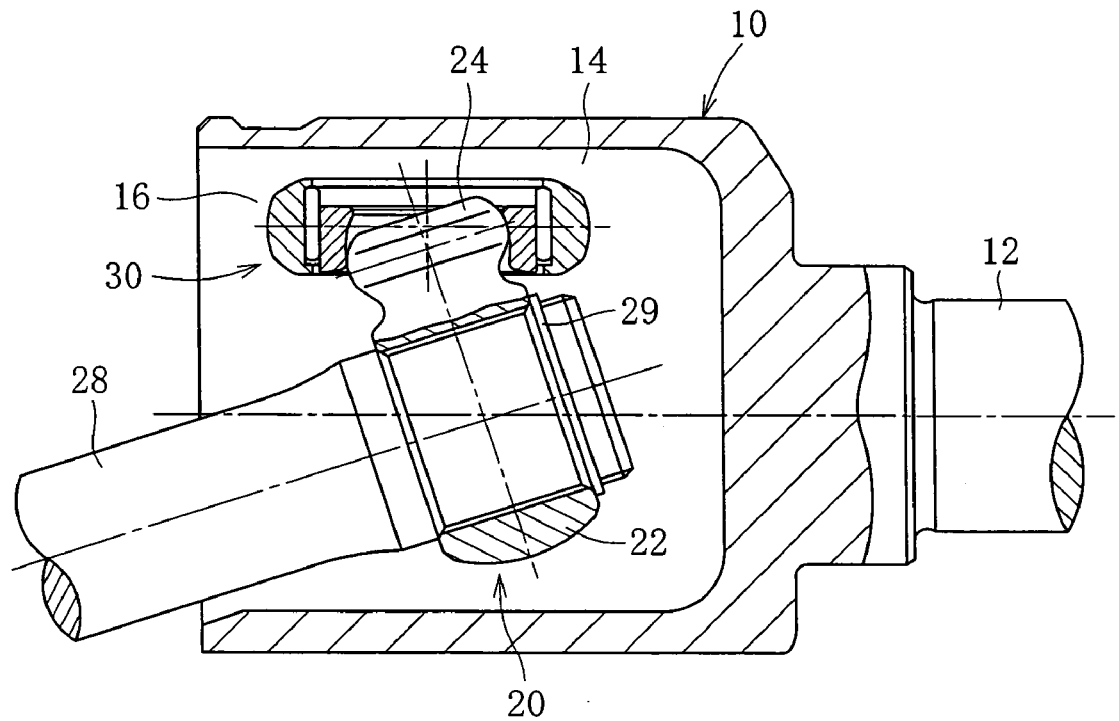
FIG. 3 is a longitudinal sectional view of the tripod constant velocity universal joint shown in FIG. a2.
Figure 4:
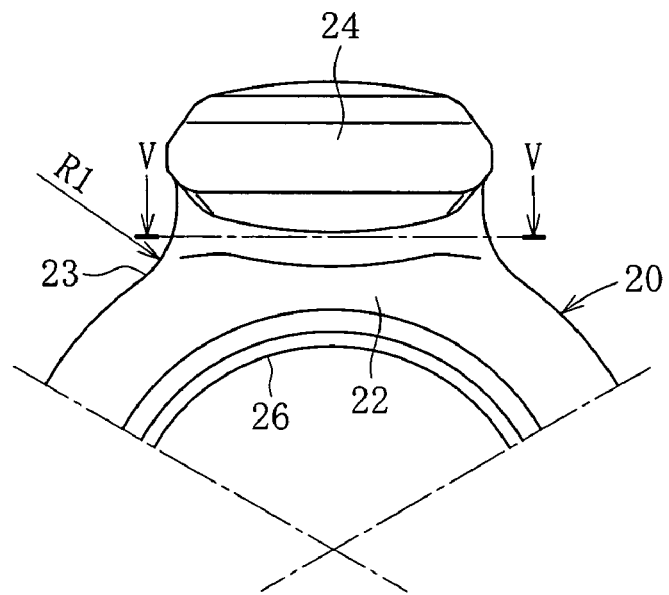
FIG. 4 is a front view similar to FIG. 1A showing a second embodiment of the invention.
Figure 5:
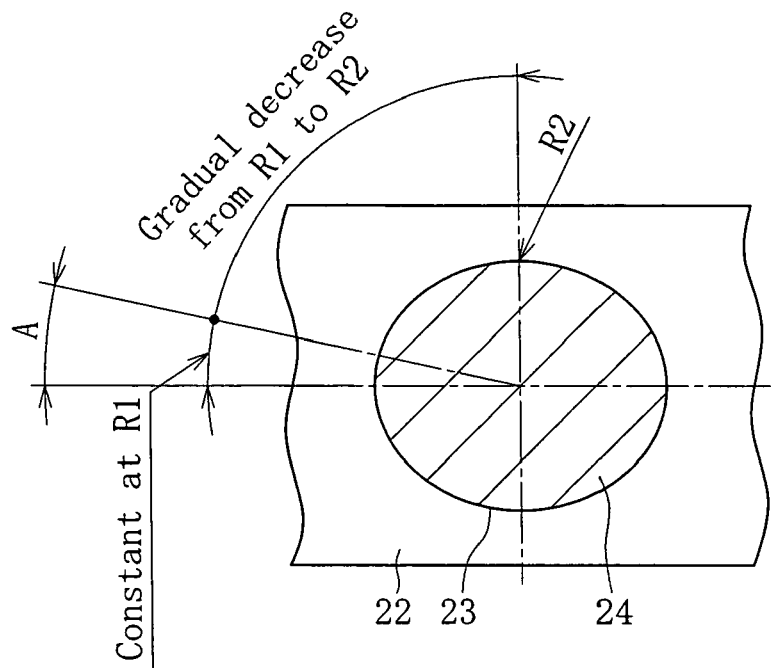
FIG. 5 is a sectional view taken along the line V-V in FIG. 4.
Figure 6:
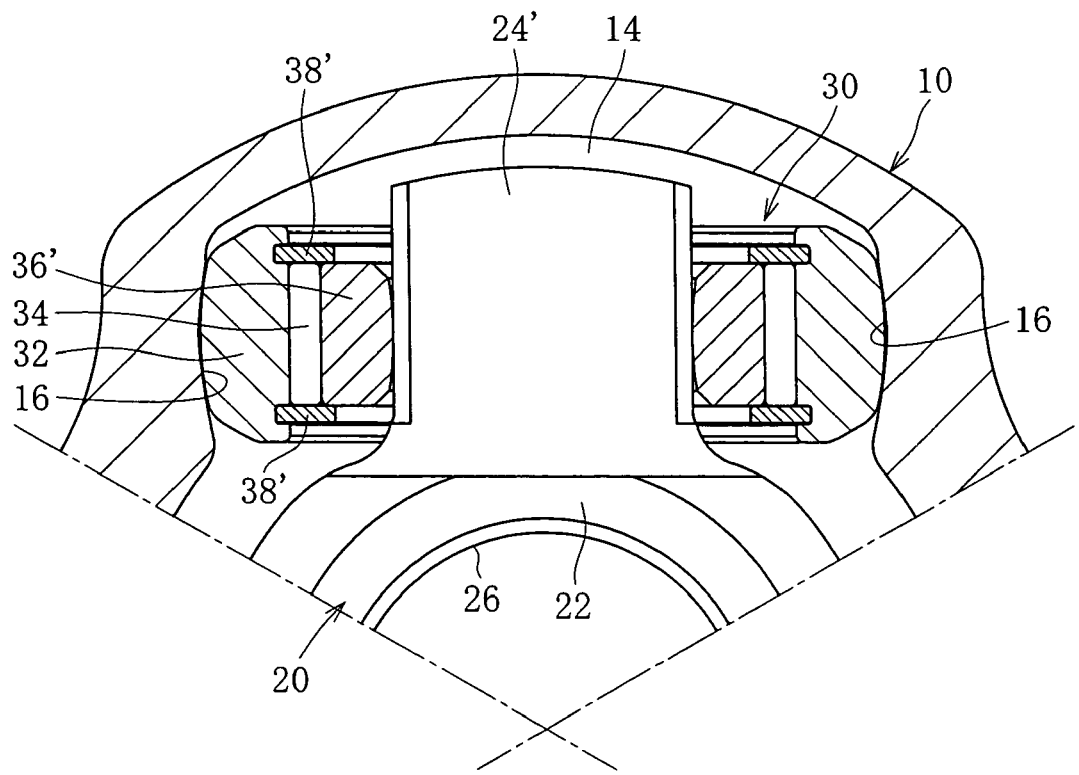
FIG. 6 is a cross-sectional view in part of a tripod constant velocity universal joint in accordance with a third embodiment of the invention.
Figure 7:
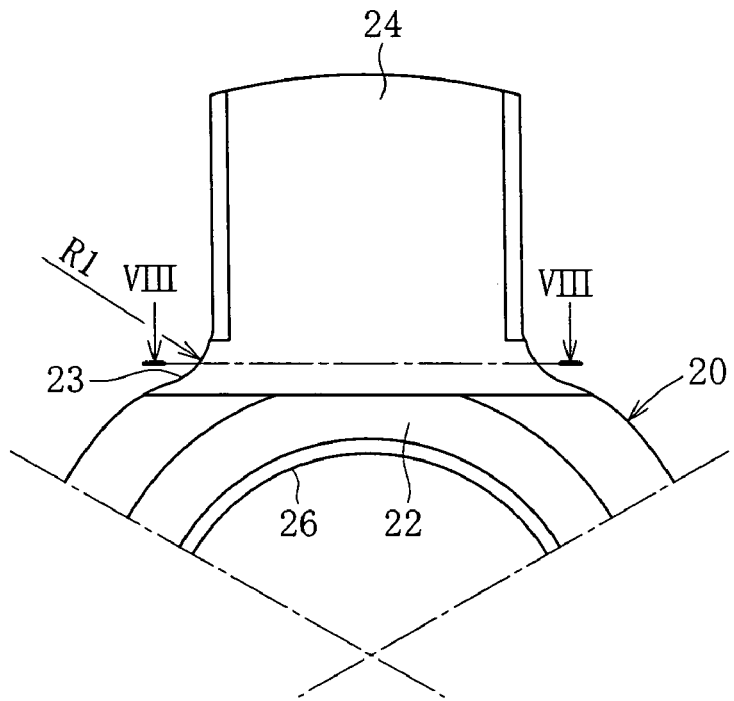
FIG. 7 is a front view in part of an inner joint member in the joint shown in FIG. 6.
Figure 8:
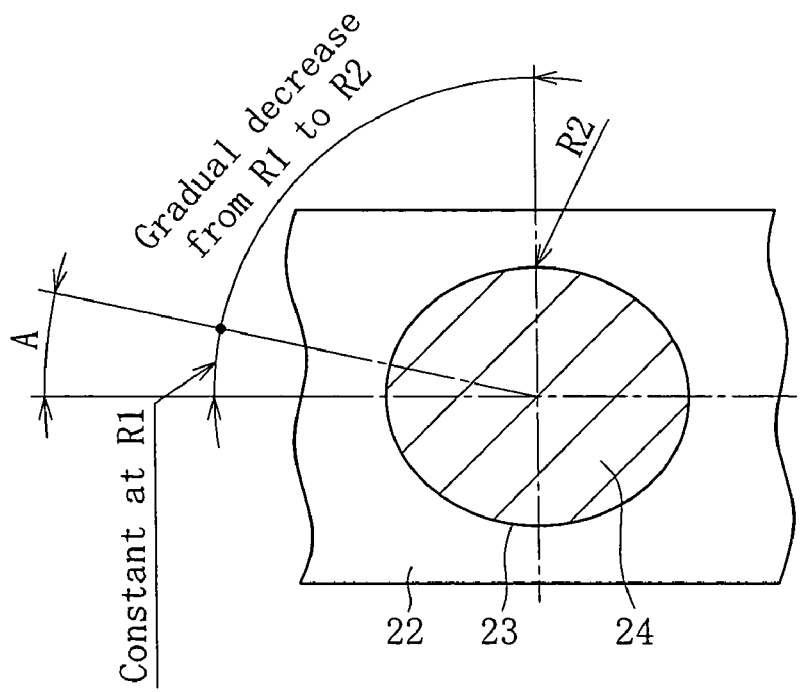
FIG. 8 is a sectional view taken along the line VIII-VIII in FIG. 7.

Embodiments of the present invention will now be described with reference to the drawings, in which FIGS. 1A to 3 show a first embodiment, FIGS. 4 and 5 show a second embodiment and FIGS. 6 to 8 show a third embodiment.

First, describing a basic configuration with reference to FIGS. 2 and 3, a tripod constant velocity universal joint has as components an outer joint member 10, an inner joint member 20 and roller cassettes 30.

The outer joint member 10 is cylindrically shaped to be opened at its one end and integral with a stem part 12. The outer joint member 10 is connected to a first rotary shaft (not shown) with, for example, the stem part 12 in spline engagement with the first rotary shaft for transmission of torque. The outer joint member 10 has three circumferentially equispaced track grooves 14 formed in an inner circumference thereof, the track grooves 14 extending axially of the outer joint member 10. Each of the track grooves 14 is recessed in the inner circumference of the outer joint member 10 and a pair of opposite side walls of the track groove 14 provide guideways 16, and guide shoulders 18 are formed on the radially outer side of the guideways 16.

The inner joint member 20 is comprised of a boss 22 and three journals 24. The boss 22 is connected to a second rotary shaft 28 for transmission of torque. For example, the boss 22 has a splined hole 26 and is in spline engagement with the shaft 28, with a retaining ring 29 snapped in a groove formed in the shaft. The journals 24 are equispaced circumferentially of and protrude radially from the boss 22. An end of each journal 24 is substantially spherical.

A journal bottom part 23 connecting the boss 22 to the journal 24 of the inner joint member 20 has a non-circular cross section with a diameter measured in a circumferential direction of the boss being larger than a diameter measured in an axial direction of the boss. See FIGS. 5 and 8, each of which shows an ellipse having a minor axis extending in the axial direction of the boss and accordingly of the joint as a typical example of the non-circular cross section with a diameter measured in a circumferential direction of the joint being larger than a diameter measured in an axial direction of the joint.

Each of the journals 24 carries the roller cassette 30, which is a double-roller type comprised of an outer roller 32 and an inner roller 36. A series of rolling elements, that is, needle rollers 34 are interposed between a cylindrical inner circumference of the outer roller 32 and a cylindrical outer circumference of the inner roller 36. Accordingly, the outer roller 32 and the inner roller 36 are relatively rotatable and axially movable. To prevent the needle rollers 34 from slipping out, an annular flange 38 is formed to face each end of the needle roller 34.

The guideway 16 of the outer joint member 10 provides a raceway for the rolling of the outer roller 32. FIG. 2 exemplifies the case where the outer circumference of the outer roller 32 is a torus having a radius of curvature of its generator smaller than half the outer diameter of the outer roller 32 while the guideway 16 is a part-cylindrical surface having a substantially same curvature as the torus. The guide shoulders 18 face an end face of the outer roller 32 and serve to restrain any inclination of the outer roller 32 to thereby allow the roller cassette 30 to smoothly rotate in the axial direction of the outer joint member 10.

The inner circumference of the inner roller 36 is spherical and has a substantially same radius of curvature as the substantially spherical outer circumference of the journal 24, so that the inner roller 36 and the journal 24 are in engagement one within the other. Accordingly, the inner roller 36 can swing and rotate with respect to the journal 24. A reference numeral 25 in FIG. 1B designates a relieving portion formed by partially cutting away the substantially spherical journal 24 at opposing locations in the circumferential direction of the joint. The existence of the relieving portions 25 facilitates the fitting of the inner roller 36 over the journal 24.

Figure 9:
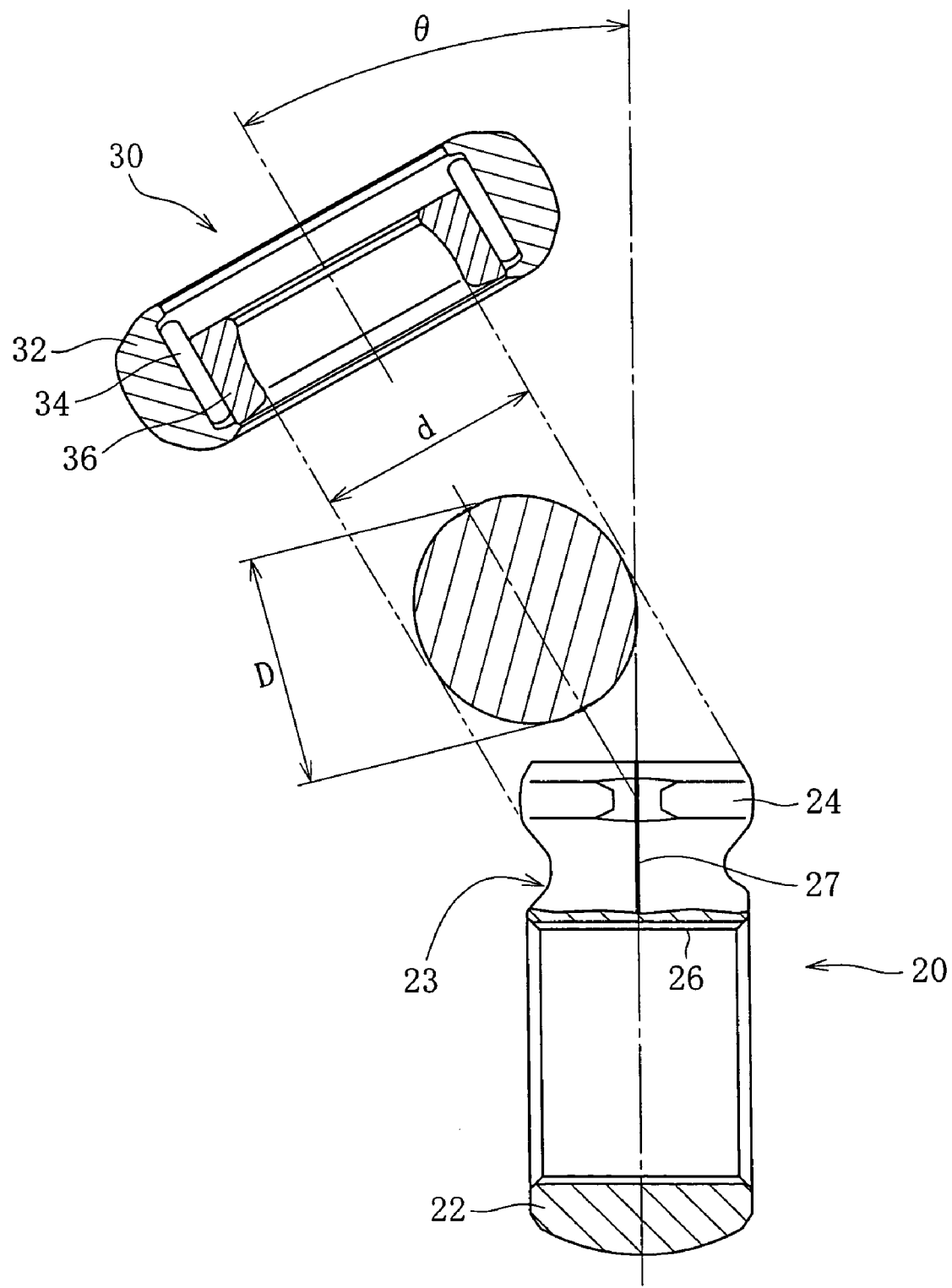
FIG. 9 is a exploded sectional view for explaining a procedure of mounting a roller cassette to a journal of an inner joint member.

The roller cassette 30, and the inner roller 36 in particular, is mounted to the journal 24 of the inner joint member 20 in an inclined state as shown in FIG. 9. Given that the inclination angle is $\Theta$, a projected maximum diameter D as viewed in the direction of the angle $\Theta$ of the journal 24 including the outermost part of a protuberant part of a forging parting line 27 is set to be smaller than an inner diameter d on the engagement side of the inner roller 36.

During use of the tripod constant velocity universal joint thus configured, when the first rotary shaft, for example, rotates, this rotation is transmitted from the outer joint member 10 to the boss 22 of the inner joint member 20 through the roller cassette 30 and the journal 24 to rotate the second rotary shaft 28. Furthermore, the axes of the first and second rotary shafts are not coaxial as shown in FIG. 3, or in other words, the joint forms an operating angle, with the rotation of both shafts, the outer roller 32 rolls on the guideway 16 of the corresponding track groove 14 and displaces in the axial direction of the journal 24. By these movements, as known, constant angular velocity between the first and the second shafts is ensured.

Figure 1A:
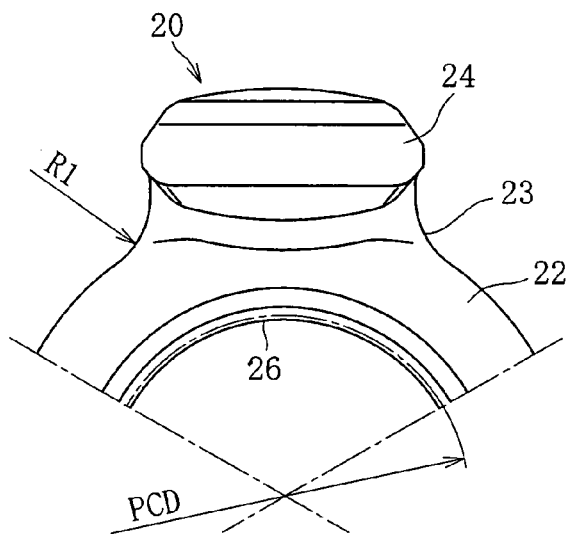
FIG. 1A is a front view in part of an inner joint member of a tripod constant velocity universal joint in accordance with a first embodiment of the invention.
Figure 1B:
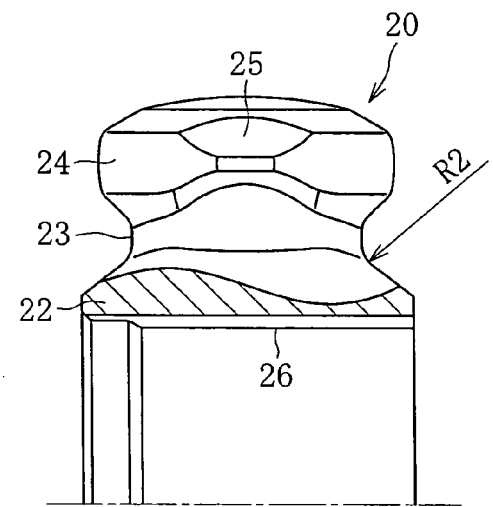
FIG. 1B is a side view of the inner joint member shown in FIG. 1A.

Describing a first embodiment with reference to FIGS. 1A and 1B, the journal bottom part 23 connecting the boss 22 of the inner joint member 20 to the journal 24 is concavely curved, and given that a radius of curvature of the journal bottom part as viewed in a plane perpendicular to the axis of the joint is $R_1$ (FIG. 1A), and that a radius of curvature of the journal bottom part as viewed in a plane including the axis of the joint and the axis of the journal is $R_2$ (FIG. 1B), $R_1$ is larger than $R_2$ and $R_1$ gradually decreases down to $R_2$.

Given that a ratio of the radius of curvature $R_1$ to the radius of curvature $R_2$ is a, it is preferred to set $2.0 \leq a \leq 6.5$. In the case of $a<2.0$, $R_2$ is too large and the journal bottom part interferes with the roller cassette 30, thus lowering the maximum operating angle of the joint. It is therefore necessary to increase the pitch diameter of the joint in order to prevent the interference, which in turn leads to an increase in the outer diameter of the joint. In the case of $a>6.5$, since $R_2$ is too small, forging formability may be deteriorated.

Furthermore, given that a ratio of the radius of curvature $R_1$ to the pitch diameter of the splined hole 26 of the boss 22 is b, it is preferred to set $0.13 \leq b \leq 0.25$. In the case of $b<0.13$, since $R_1$ is too small, the strength of the inner joint member 20 may be lowered. In the case of $b>0.25$, since $R_1$ is too large and interferes with the roller cassette 30 and the maximum operating angle of the joint decreases, it is necessary to increase the pitch diameter of the joint to prevent the interference, possibly leading to an increase in the outer diameter of the joint.

In a second embodiment shown in FIGS. 4 and 5, in contrast to the above-mentioned embodiment, the radius of curvature $R_1$ of the journal bottom part 23 is constant in an angle range represented by a reference character A (FIG. 5). Outside the angle range, the radius of curvature is gradually decreased from $R_1$ to $R_2$ as in the first embodiment.

Also in this embodiment, it is possible to realize reductions in size, weight and costs of the joint without sacrificing the maximum operating angle of the joint while maintaining the strength of the journal bottom part 23 as a possible weakest part of the inner joint member 20 in strength. Desirably, the angle range A is maximized as long as it does not affect the maximum operating angle of the joint, and preferably, $A \geq 5°$.

In a third embodiment shown in FIGS. 6 to 8, an outer circumference of a journal 24' is shaped like an elliptic cylinder having a major axis oriented in a circumferential direction of the joint while an inner circumference of an inner roller 36' has a convex arc shaped generator. Consequently, the inner roller 36' can swing, rotate and axially move with respect to the journal 24'. The roller cassette 30 is formed as a cassette literally. That is, a washer 38' is attached to an annular groove formed in an inner circumference on each end of the outer roller 32, thereby preventing the needle rollers 34 and the inner roller 36' from slipping out. Since the outer roller 32 and the inner roller 36' move unitarily, they can be handled as a unit.

As shown in FIG. 8, as in the first and the second embodiments, the radius of curvature of the journal bottom part 23 is decreased from $R_1$ measured in a plane perpendicular to the joint axis to $R_2$ measured in a plane including the axis of the joint and the axis of the journal. Here, as in the first embodiment, given that a ratio of the radius of curvature $R_1$ to the radius of curvature $R_2$ is a, it is preferred to set $2.0 \leq a \leq 6.5$. Furthermore, given that a ratio of the radius of curvature $R_1$ to the pitch diameter of the splined hole 26 of the boss 22 is b, it is preferred to set $0.13 \leq b \leq 0.25$.

What is claimed is:

1. A tripod constant velocity universal joint comprising:
   an outer joint member having three, circumferentially equispaced, axially extending track grooves formed in an inner circumference thereof, the outer joint member being connected to a first rotary shaft for transmission of torque;
   an inner joint member having a boss connected to a second rotary shaft for transmission of torque and three circumferentially equispaced journals each radially protruding from the boss, each journal being connected to the boss at a journal bottom part; and
   a roller cassette interposed between the outer joint member and the inner joint member for transmission of torque,
   wherein the journal bottom part of at least one journal comprises a concavely curved portion such that a first radius of curvature of the concavely curved portion of the journal bottom part as viewed in a plane perpendicular to an axis of the joint is larger than a second radius of curvature of the concavely curved portion of the journal bottom part as viewed in a plane parallel to the axis of the joint and an axis of the at least one journal, and wherein a radius of curvature of the concavely curved portion of the journal bottom part gradually decreases from the first radius of curvature down to the second radius of curvature.

2. The tripod constant velocity universal joint according to claim 1, wherein the roller cassette comprises an outer roller and an inner roller which are rotatable relative to each other via rolling elements, the outer roller being capable of rolling along a guideway formed on one of the track grooves, with an end face of the outer roller guided by a guide shoulder formed on the one of the track grooves, a substantially spherical inner circumference of the inner roller being in engagement with a substantially spherical outer circumference of the at least one journal.

3. The tripod constant velocity universal joint according to claim 1, wherein the roller cassette comprises an outer roller and an inner roller which are rotatable relative to each other via rolling elements, the outer roller being capable of rolling along a guideway formed on one of the track grooves, and wherein an inner circumference of the inner roller has a convex arc-shaped generator in engagement with one of the journals, the one of the journals having an elliptic cross section with a major axis extending in a circumferential direction of the joint.

4. The tripod constant velocity universal joint according to claim 1, wherein the journal bottom part of the at least one journal has a non-circular cross section with a diameter measured in a circumferential direction of the joint being larger than a diameter measured in an axial direction of the joint.

5. The tripod constant velocity universal joint according to claim 2, wherein the at least one journal includes relieving portions at opposing locations in a circumferential direction of the joint, so as to allow the inner roller to be fitted over the substantially spherical outer circumference of the at least one journal.

6. The tripod constant velocity universal joint according to claim 1, wherein the first radius of curvature is constant over a predetermined angle range along a circumferential direction of the journal bottom part.

7. The tripod constant velocity universal joint according to claim 1, wherein a ratio a of the first radius of curvature to the second radius of curvature is set such that $2.0 \leq a \leq 6.5$.

8. The tripod constant velocity universal joint according to claim 1, wherein a ratio b of the first radius of curvature to a pitch diameter of a splined hole of the boss is set such that $0.13 \leq b \leq 0.25$.

* * * * *